United States Patent [19]

Olson

[11] Patent Number: 4,890,884
[45] Date of Patent: Jan. 2, 1990

[54] CANTILEVER SUPPORTS

[76] Inventor: Ronald D. Olson, 1489 S. 84th St., West Allis, Wis. 53214

[21] Appl. No.: 271,048

[22] Filed: Nov. 14, 1988

[51] Int. Cl.⁴ .............................................. A47C 15/00
[52] U.S. Cl. .................................... 297/232; 297/445; 297/451
[58] Field of Search ............... 297/232, 450, 451, 454, 297/458, 445, 192, 158, 243, 248; 108/108; 248/351; 182/90; 296/63, 64, 208

[56] References Cited

U.S. PATENT DOCUMENTS

| | | | |
|---|---|---|---|
| 3,747,979 | 7/1973 | Barecki | 297/445 |
| 3,897,974 | 8/1975 | Barecki | 297/232 |
| 3,899,211 | 8/1975 | Barecki | 297/445 |
| 4,118,062 | 10/1978 | Harder, Jr. et al. | 297/451 |
| 4,120,533 | 10/1978 | Harder, Jr. | 297/232 |
| 4,718,719 | 1/1988 | Brennan | 297/216 |
| 4,732,359 | 3/1988 | Danton | 297/445 |

Primary Examiner—Peter R. Brown
Assistant Examiner—Brian K. Green
Attorney, Agent, or Firm—Fred Wiviott

[57] ABSTRACT

A support for a cantilevered object comprises support member having an X-shaped configuration defined by a central portion and a pair of a spaced apart lower arms attached to the support from which the cantilevered object extends and a pair of spaced apart upper arms constructed and arranged to be secured to the cantilevered object intermediate its ends. The member extends upwardly and outwardly from the support and is curvilinear from its lower to its upper end.

9 Claims, 2 Drawing Sheets

CANTILEVER SUPPORTS

BACKGROUND OF THE INVENTION

This invention relates to a support for a cantilevered member.

As those skilled in the arts will appreciate, a cantilever is a beam or member supported at only one end and commonly projecting horizontally from a vertical surface. Because of their mass or the load which they are required to support, it is often necessary to provide an inclined support located beneath the member to support its weight and load requirements. Such additional supports for cantilevers may be desirable in such applications as, static and mobile seating, shelving, decks, supports for planters, boat dive platforms and the like. In the case of motor coach and commuter rail type seating, a cantilever with an additional support are commonly employed. Such seats are normally designed to hold two persons with one being on the remote end adjacent to the aisle and the second adjacent the vehicle wall.

For mass transit seating, it desirable to provide a support which has a compact profile to provide room for the passenger's legs and any packages they may be carrying, and to facilitate lighting and air circulation. Furthermore, it is desirable that the support not facilitate the collection of rubbish or vermin. An additional desired feature of such supports is that they enhance the resistance of the seat frame to twisting relative to the wall in the event of an accident.

SUMMARY OF THE INVENTION

It is an object of the invention to provide a new and improved support for a cantilever member.

Another object of the invention is to provide a support for a cantilever member which assists the cantilever in its resistance to twisting.

Another object of the invention is to provide a support for a cantilevered seat for use in a mass transit vehicle which facilitates lighting and air passage and provides room for passenger's legs and packages.

A still further object of the invention is to provide a support for a cantilevered mass transit seat which does not facilitate the collection of refuse and vermin.

These and other objects and advantages of the instant invention will become more apparent from the detailed description thereof taken with the accompanying drawing.

In general terms, the invention comprises a support for a cantilevered object and includes a member which is generally X-shaped and is defined by a central portion and a pair of spaced apart lower arms constructed and arranged to be attached to the support from which the cantilever extends, and a pair of spaced apart upper arms constructed and arranged to be attached to the object intermediate its ends. The member is curvilinear from its lower to its upper end.

DETAILED DESCRIPTION OF PREFERRED ENBODIMENT

Figure 1:
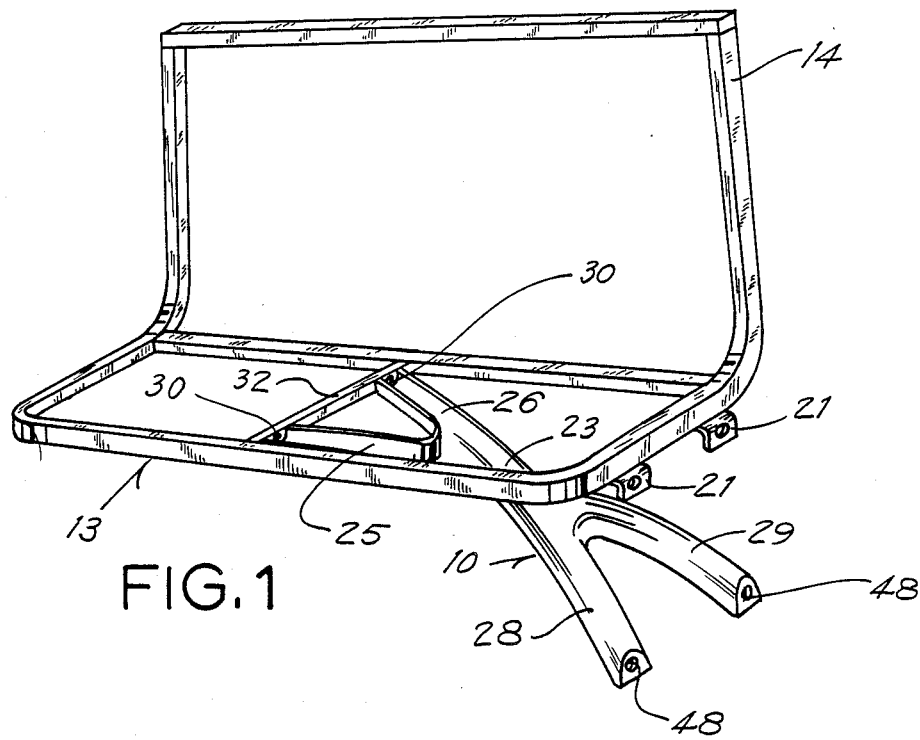
FIG. 1 is a perspective view of the support according to the preferred embodiment of the invention as applied to a mass transit vehicle seat.
Figure 2:
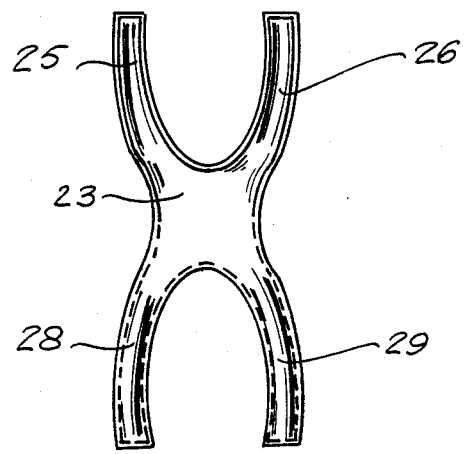
FIG. 2 is a plan view of the support according to the invention.

FIG. 1 shows the application of a support 10 according to the preferred embodiment of the invention to the frame 12 of a mass transit vehicle seat, by way of example. However, those skilled in the art will appreciate that the support has other applications as well such as, shelving, decks, planter supports, boat dive platforms and the like.

Seat frame 12 may comprise any conventional shape and includes a horizontally extending seat portion 13 and a back rest portion 14 extending upwardly and outwardly therefrom. Those skilled in the art will appreciate that the seat frame 12 may be composed of any suitable material, such as steel tubing. The frame 12 is supported from the adjacent side wall 18 of the vehicle in any coventional manner such as by bolts which extend through openings 20 in brackets 21 secured to one end of the seat portion 13.

The support 10 is generally X-shaped and is defined by a center section 23, a pair of upper arms 25 and 26 and a pair of lower arms 28 and 29. Upper arms 25 and 26 are channel-shaped in transverse cross-section. The channels extends from the center section 23 to the ends of arms 25 and 26 and are generally upwardly facing. Similarly, the lower arms 28 and 29 are formed of downwardly facing channel sections.

Figure 5:
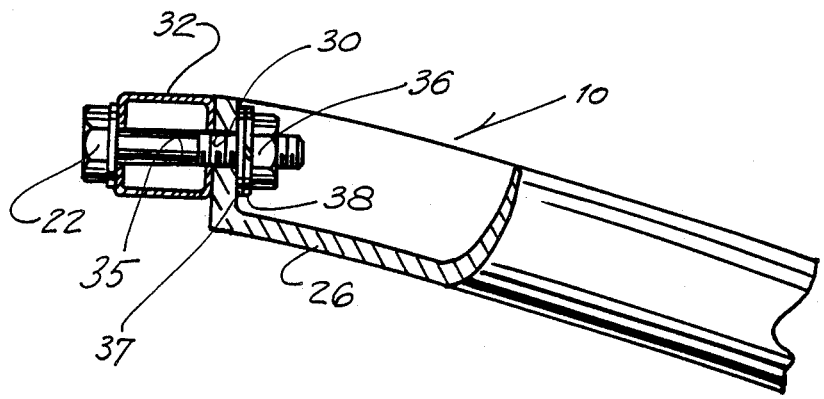
FIG. 5 is a fragmentary view, with parts broken away, showing the attachment for the support at one end thereof.

A hole 30 is formed in the remote ends of arms 25 and 26 to permit attachment to a support 32 extending across the seat portion 13 of frame 12 at approximately its midpoint. The means of attachment of the arms 25 and 26 are identical so that only the attachment of arm 26 will be discussed in relation to FIG. 5, for the sake of brevity. In particular, a bolt 34 extends through a pair of openings 35 in support 32 and which are aligned with opening 30 in the end of leg 26. The bolt 22 is secured by a nut 36, a washer 37 and a lock washer 38. It can be seen that as a result the channel-shape of leg 36, the end of the bolt 34 is shielded on three sides by the leg 36 and on its upper side by the seat (not shown) that is to be attached to frame 12. As a result, the bolt 34 will not be exposed for injuring persons using the vehicle in which the seat is installed.

Figure 6:
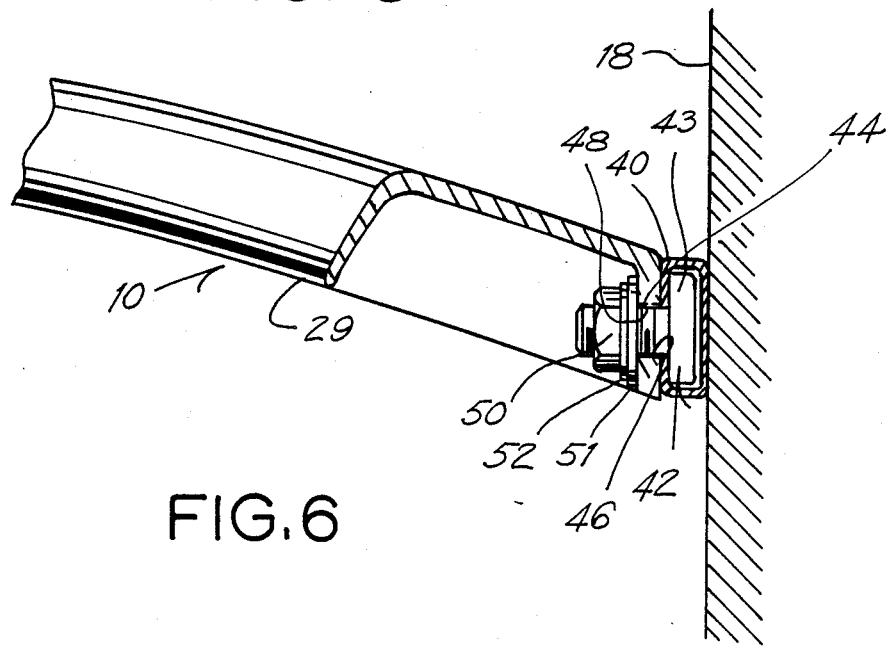
FIG. 6 is a fragmentary view, with parts broken away, showing the attachment at the other end of the support.

The lower ends of arms 28 and 29 are attached in an identical manner so that the attachment of leg 29 only will be discussed in relation to FIG. 6. In particular, a tubular mounting track 40 is secured horizontally to the vehicle wall 18. A pair of studs 42 are provided for each seat and each includes a head 43 mounted within the track 40 and a threaded stud 44 extending through a slot 46 formed in the front face of track 40. Stud 44 also extends through an opening 48 in the end of leg 29 and is secured by a nut 50, a washer 51 and a lockwasher 52. It can be seen that because leg 29 comprises a downwardly opening channel, the stud 44 and nut 50 will be shielded from contact by the users. In addition, the downwardly facing channels will not provide a receptical for the accumulation of trash.

Figure 3:
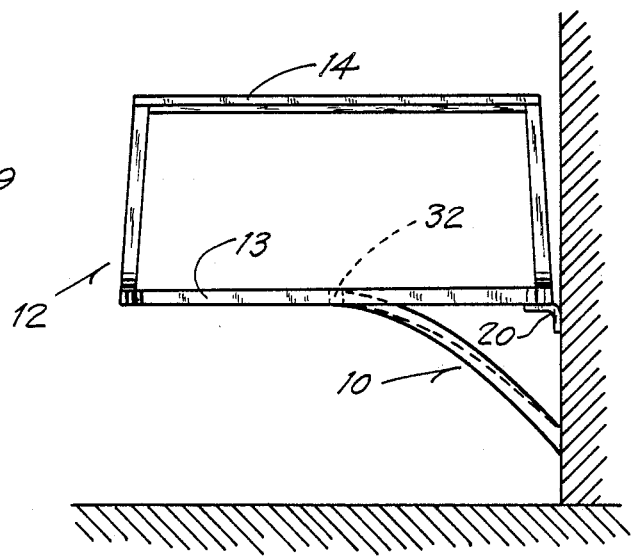
FIG. 3 is a front view of the support illustrated in FIG. 1.
Figure 4:
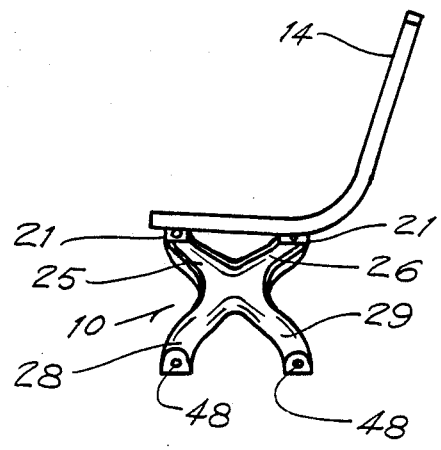
FIG. 4 is a side elevational view of the support illustrated in FIG. 1.

As seen in FIGS. 1 and 3, the support 10 is formed in a downwardly facing arc from its lower to its upper end. Because the support arches upwardly toward the seat, greater leg room will be provided than in the case of a linear support. Further, because the support has a relatively thin profile, it will not block light or air circulation.

Those skilled in the art will appreciate that the support 10 may be formed of any suitable material, such as steel, aluminum or a non-metallic composite. One non-metallic composite that has been employed is sold under the trademark ROYTON. Non-metallic composits provide a high strength to weight ratio and are corrosion resistant. In addition, the X-shape of the support 10 will not only maintain the seat frame 12 in its desired position but will also resist twisting relative to the wall 16 in the event of a collision.

While only a single embodiment of the invention has been illustrated and described, it is not intended to be limited thereby but only by the scope of the appended claims.

I claim:

1. A first support for a cantilevered object extending from a second support, the first support comprising a member having an X-shaped configuration defined by a central portion and a pair of spaced apart lower arms constructed and arranged to be attached to the support from which the cantilevered member extends and a pair of spaced apart upper arms constructed an arranged to be secured to the cantilevered object intermediate its ends, the member being curvilinear from its lower to its upper end, said lower and upper arms extending from said central portion and each having remote ends spaced from said central portion and including attachment means at the remote ends of each arm, for attachment to the cantilevered member and the support from which the cantilevered member extends, each of the upper arms comprises an upwardly facing channel section and each of the lower arms defining a downwardly facing channel section.

2. The support set forth in claim 1 wherein the support is comprised of a non-metallic material.

3. The support set forth in claim 2 wherein the upper and lower arms are curvilinear and extend outwardly from the central portion, the ends of the arms of each pair being generally parallel to each other.

4. The support set forth in claim 1 wherein the end of each channel member is closed and has an aperture formed therein for attaching said first support to the cantilevered member and the support from which the cantilevered member extends.

5. The combination of a mass transit vehicle seat having a frame, said frame having a pair of opposite ends and being constructed and arranged to be attached at one end to and cantilevered from the vehicle in which the seat is to be mounted, said frame including a seat portion and a back rest portion, a support member having an X-shaped configuration and including a center section, a pair of spaced apart and generally divergent lower arms extending from the center section and constructed and arranged to be attached to the vehicle generally below the one end of the seat frame, said support member extending upwardly and outwardly and having a pair of spaced apart and generally divergent upper arms extending from the center section and secured to the seat portion of the frame and intermediate the ends thereof, said arms being comprised of channel sections which are open either upwardly or downwardly along the longitudinal direction of said arms.

6. The combination set forth in claim 5 wherein said support is curvilinear from its lower to its upper end to define a downwardly facing arc.

7. The support set forth in claim 6 wherein each of the upper arms comprises an upwardly facing channel section and each of the lower arms defining a downwardly facing channel section, each channel section having a closed end provided with an aperture for attachment to the cantilevered member and the support from which the cantilevered member extends.

8. The support set forth in claim 7 wherein the upper and lower arms are curvilinear and extend outwardly from the central portion, the ends of the arms of each pair being generally parallel to each other.

9. The support set forth in claim 5 wherein each of the upper arms comprises an upwardly facing channel section and each of the lower arms defining a downwardly facing channel section, each channel section having an end remote from the center section and means adjacent each end for attachment to the cantilevered member and the support from which the cantilevered member extends.

* * * * *